United States Patent [19]
Bluege

[11] Patent Number: 5,784,023
[45] Date of Patent: Jul. 21, 1998

[54] SPEED DETECTION METHOD

[76] Inventor: John Bluege, 450 Hawthorne Dr., Lake Park, Fla. 33403

[21] Appl. No.: 494,755

[22] Filed: Jun. 26, 1995

[51] Int. Cl.⁶ ................................................ G01S 13/58
[52] U.S. Cl. ............................. 342/104; 342/54; 342/42
[58] Field of Search ........................ 342/104, 70, 71, 342/72, 44, 54, 42

[56] References Cited

U.S. PATENT DOCUMENTS

| | | | |
|---|---|---|---|
| 4,214,243 | 7/1980 | Patterson | 342/104 |
| 5,168,214 | 12/1992 | Engeler et al. | 324/77 G |
| 5,311,192 | 5/1994 | Varga et al. | 342/188 |
| 5,365,239 | 11/1994 | Stilwell, Jr. | 342/368 |
| 5,396,510 | 3/1995 | Wilson | 372/38 |
| 5,570,691 | 11/1996 | Wright et al. | 128/661.01 |

*Primary Examiner*—John B. Sotomayor

[57] ABSTRACT

An improved remote speed sensing technique is described which improves performance reliability by increasing the relative signal to noise ratio of a speed detector compared to that of a vehicle radar detector, by localizing at least one axis of the illuminating radiation to an angular region which is comparable to or within the subtence of the target vehicle, while minimizing illumination of a radar detector on the target vehicle.

31 Claims, 7 Drawing Sheets

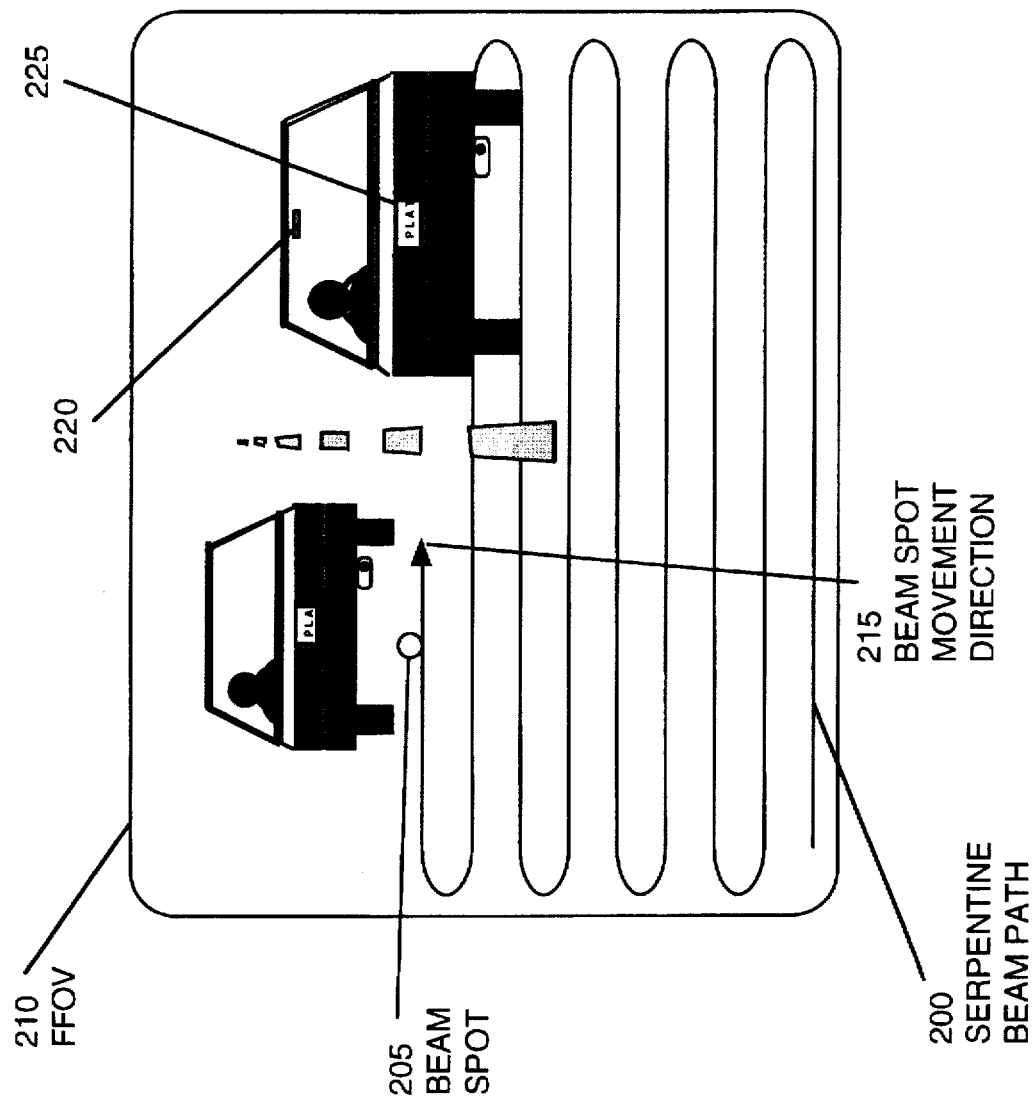

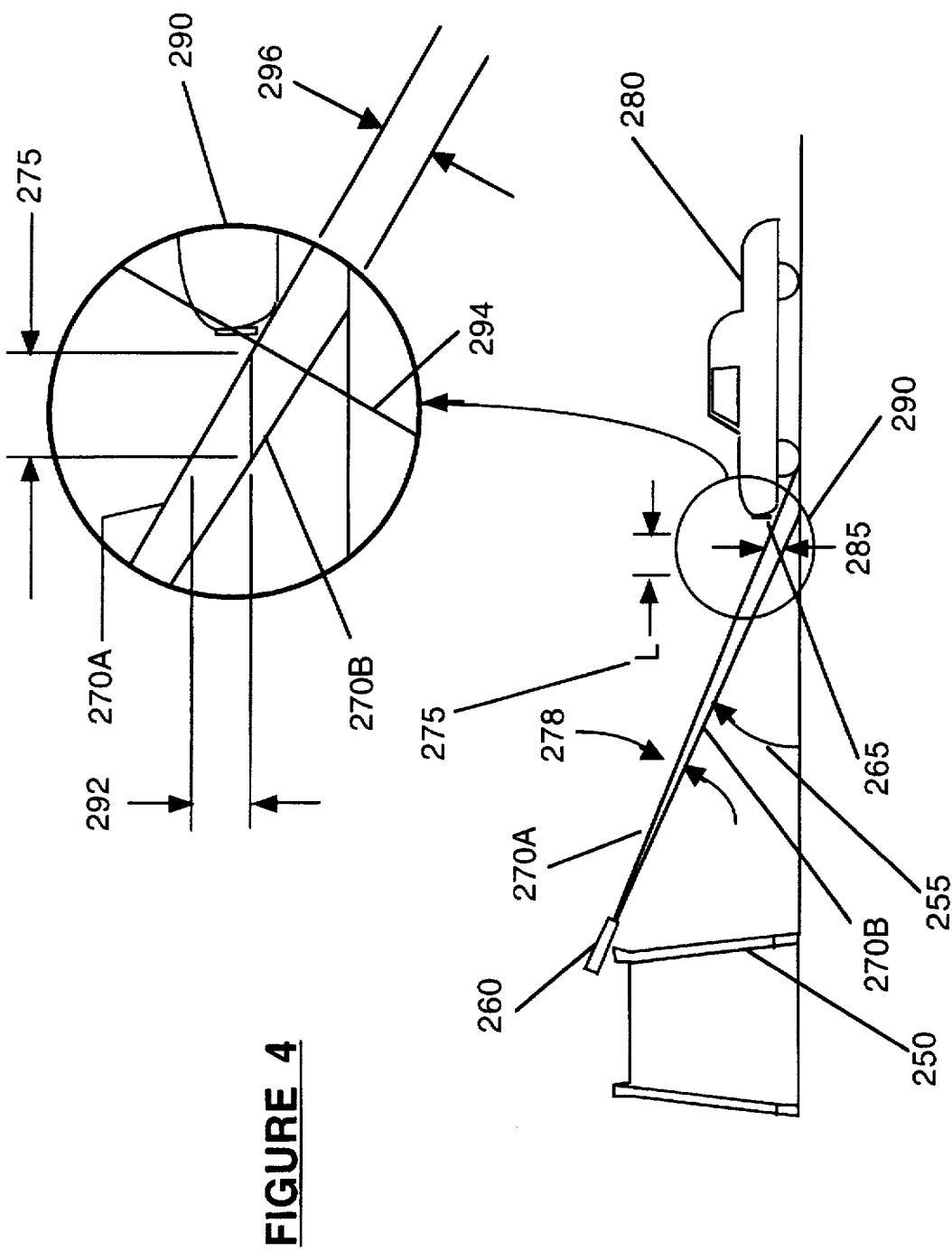

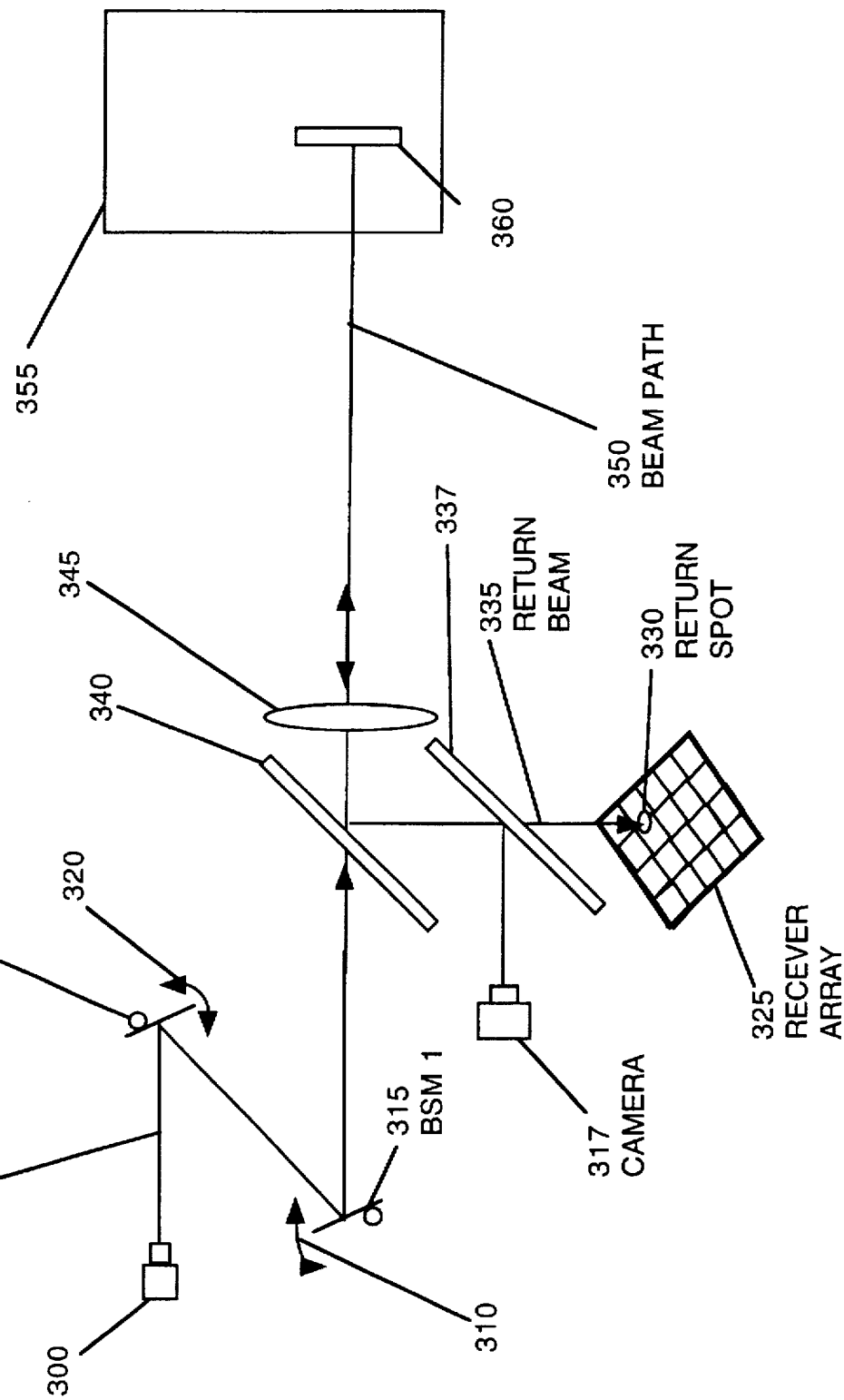

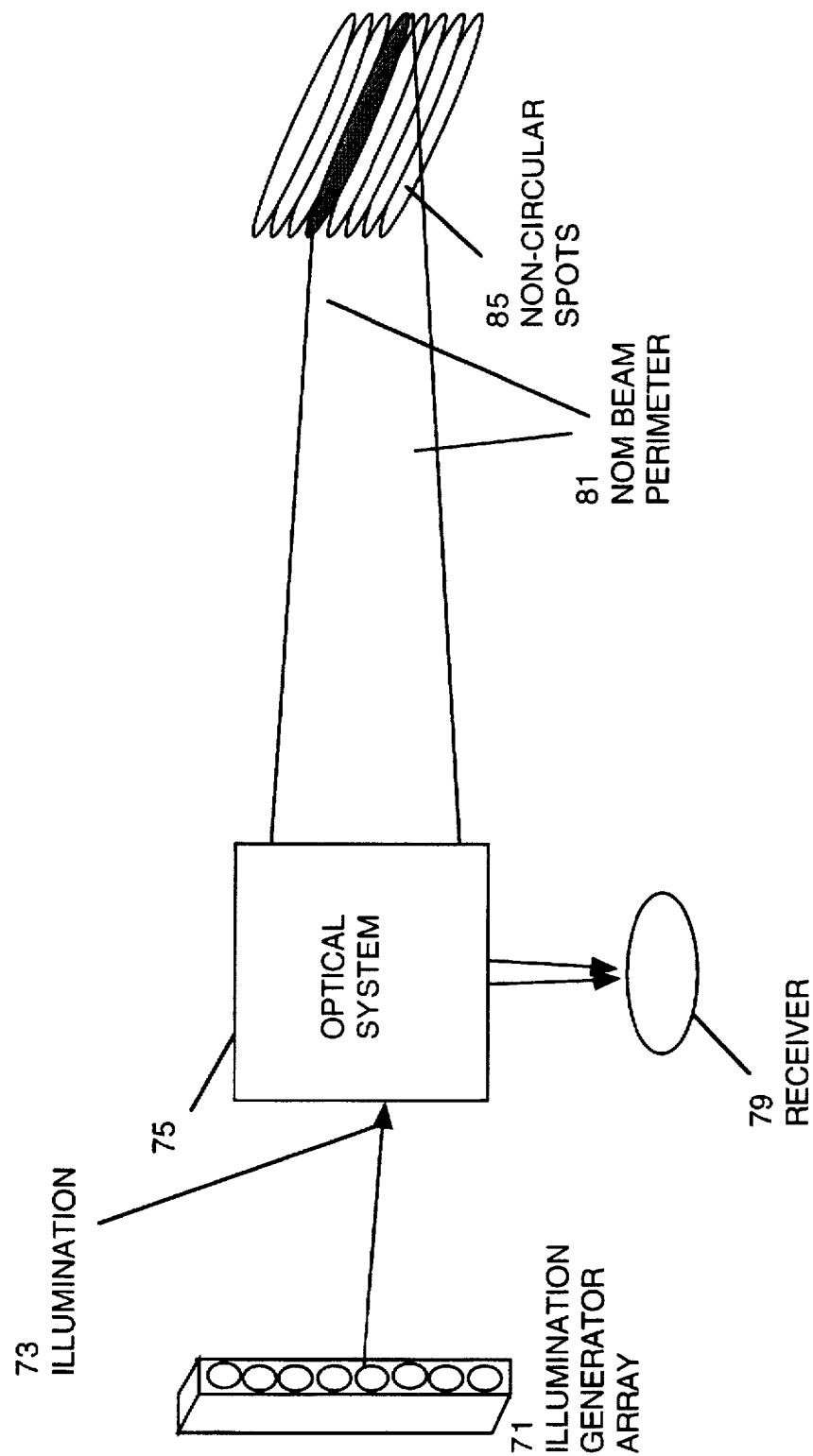

SPEED DETECTION METHOD

BACKGROUND OF THE INVENTION

1. Field of the Invention

The present invention relates to the covert determination of spatio-temporal characteristics (such as location and speed) using radiation bounced from remote objects. In particular, a method of improving both the absolute and relative signal to noise of a speed detector is described which incorporates subaperture beam manipulation and interrogation of a vehicle to maximize signal return to the speed detector while minimizing that perceived by a detector on the vehicle.

2. Description of the Prior Art

The basic concept of remotely determining the spatio-temporal characteristics of an object is well known both to those familiar with the art as well as to the bulk of the general population, particularly those who have been caught speeding by a police radar unit. Police radar illuminates vehicular traffic and monitors the reflected radiation for characteristics which indicate that one or more vehicles are exceeding the speed limit. The unit often includes a display which indicates the speed of a vehicle within the illumination zone being monitored. Until recently, such detectors exclusively used radar. Newer units use much shorter electromagnetic wavelengths, called near infrared radiation (NIR), to determine vehicle speed more quickly and accurately (Ref.

Early examples of the use of radar to determine vehicle speed are U.S. Pat. No. 3,184,015 of Sep. 1964 (Weaver Ref. 2) and U.S. Pat. No. 3,689,921 of 5 Sep. 1972 (Berry ref. 3). Since that time, numerous improvements have been made, primarily in signal to noise enhancement (references 4, 5 and 6), and extension to a mobile source platform (ref. 7 and 8). Reference 9 is U.S. Pat. No. 4,214,243 of 22 Jul. 1980 (Patterson) which describes a radar speed detector which electronically prevents some "ghost" reading errors from being displayed. Reference 10 is U.S. Pat. No. 5,396,510 of 7 Mar. 1995 (Wilson) which describes a typical visible light based speed detector system.

With these and other improvements, the use of radar detectors is a well established practice and has engendered a mature speed detection technology which has been relatively stable for several decades. Of late, however, advances in the area of radar speed detection have primarily been incremental and haven't successfully progressed in the resolution of several long known deficiencies. The introduction of LIDAR devices for speed detection has provided some improvement but still has many of the deficiencies of the more mature radar market. Some of these operational and performance problems include a.) a lack of reliable covert detection and lock capability during illumination, b.) the inability to reliably identify which vehicle is speeding when the illumination covers more than one vehicle, and c.) a limitation in operating range.

This lack of performance reliability occurs because current speed detector concepts are designed to emit a signal which illuminates a relatively large angular area, which generally includes, at the very least, the target vehicle and a large area in its vicinity which often encompasses many vehicles at a time. They over-fill their target region for a brief period before they can detect and reliably determine vehicle speed. With classical radar detection, this overfill is quite large and can cover many vehicles within the device's field of view.

Unfortunately, this large illumination area has several disadvantages. It introduces severe noise into the returned signal, it greatly reduces the fraction of returned power from any one vehicle, it requires that the radar operator make a judgment as to which vehicle is speeding if more than one vehicle is within the region of radar illumination, and, it assures illumination of passive speed detectors both on the target vehicle (such as the vehicle dashboard) and on other vehicles within the range of illumination, thus, warning all vehicles within this relatively large illumination region, if they have suitable detectors. Each of these overfill defects is discussed in detail below.

Much of the signal noise results from reflections from multiple sources which can overwhelm or confound the signal reflected from the target vehicle. For example, Berry notes (ref. 6) that when the target vehicle and the radar vehicle are both moving, the received Doppler signal is a complex wave composed of many frequency sources such as the static objects (the road), the target vehicle, and any other objects within the beam such as other vehicles (moving at different speeds), pedestrians, birds, and the like. Each is representative of the relative speed of the object with respect to the radar platform vehicle. In addition, intermediate frequency variations in the direction of viewing further complicate the return signal spectral characteristics. These effects are in addition to classical electronic signal to noise issues endemic to the real world.

The next overfill problem arises from simple geometric losses. With the large overfill used in most radar speed detectors, the great majority of the radiated energy completely misses the target and is lost. Only that fraction of the signal that "hits" the target can be used to determine the target vehicle's speed. Typically, this is a very small fraction of the signal that is lost. And the relative amount of this loss rapidly increases with distance. The intensity of the signal drops with the square of the distance between the radar signal generator and the target vehicle ($d^2$). Thus, the great majority of the original signal is wasted. Another problem with the rapid power loss is that it reduces the effective operating range of the speed detector. This is true of any overfill concept, even including the new infra-red LIDAR speed detectors (for which it has been reported that the range of LIDAR is less than that of radar(ref. 10)

Another overfill problem is the heavy dependence on the judgement of the radar operator. While an advantage of this overfill is that the speed detector operator need only point the speed detector device in the general direction to achieve effective operation (since the beam covers such a large field of view (FOV) that hand or operator motion induced tracking errors are insignificant). But because the beam covers such a large area, it often bounces off more than one vehicle. And since the radar beam doesn't discriminate among vehicles, the radar operator must decide which vehicle was speeding.

Since the signal illuminating the target is usually much larger than that which returns to the signal generator location, a low cost, radar detector in the vehicle will indicate the presence of the sensing beam at a distance well beyond that detectable by even a very sensitive (and expensive) radar speed detector. This is because the transmitted signal drops in intensity approximately as the square of the distance ($d^2$) between the radar signal generator and the target vehicle, while the signal, which is received by the speed detector, drops at a much more severe rate (on the order of $d^4$).

The latter overfill issue has an additional deleterious effect in that the relatively low effectiveness of current speed detectors engenders a perception that with the use of "radar detectors", a driver can "beat" the system. This is buttressed by studies which suggest that drivers using radar detectors have more accidents than those who don't (ref. 11). The use of a fully or effectively covert system could reduce such perceptions dramatically.

The ideal solution is to preclude the target's ability to realize that it is being monitored until evaluation is complete. This would be achieved either by operating fully covertly (such that the target vehicle never detects illumination), or effectively covertly, where vehicle detection would not occur until after the speed has been safely and reliably determined. When widely implemented, vehicle operators would soon realize that illumination would indicate successful detection, and that it would be too late to initiate any useful avoidance action. The operator would feel less pressure to exhibit dangerous driving behavior and would tend to slow in a more appropriate fashion.

Another problem with the existing technology is that its effective operating range is relatively limited. For example, it has been reported that the range of LIDAR is less than that of radar: "LIDAR detection range is far less than that of radar" (ref. 12).

As noted above, new remote speed detectors are now available which use near infrared radiation (NIR). They operate more rapidly than radar speed detectors and are able to sense and determine a vehicle's speed in a fraction of the time taken by radar units. This improvement in speed determination is achieved in part by the much higher electromagnetic frequencies used and by reducing the size of the overfill illumination cone angle of the source beam.

The narrower illumination angle increases the fraction of returned energy (compared to radar) and serves to reduce noise reflections from objects at large angles from the center of the illuminating beam.

Unfortunately, because NIR devices emit this much narrower cone of illumination, they are more difficult to precisely establish and hold a track on a vehicle. Thus, while they can very rapidly determine a vehicle's speed once the target vehicle is located and stably illuminated, the intermittent pre-illumination of the target vehicle as the beam is imperfectly moved to an appropriate location may provide sufficient time for the vehicle operator to react. Since the vehicle operator now knows that intermittent illumination indicates that his vehicle is being selectively monitored, the detection of such illumination will lead to a more rapid vehicle response which in turn could lead to a successful avoidance (by slowing or weaving between other vehicles), or the increased possibility of an accident. Thus, while the improvements are real, they are still incremental. And to some degree, they are offset by LIDAR disadvantages such as the aforementioned alignment difficulty, reducing operating geometry, and a reduced operating range.

Another concern is the extension of the range of detectability beyond that of current state of the art. Usually this is done by simply increasing the power of the illuminator. Unfortunately, such power increases encounter several areas of difficulty such as increased cost and safety. The cost is due to the use of higher power equipment which must increase rapidly with only a small increase in operating distance (due to the very high attenuation of scattered return signal power as a function of distance (nominally to the fourth power $(d^4)$). For example, to increase the range by a factor of two requires an increase of power and/or detection sensitivity by a factor of nominally 16. Since the vehicle radar detector sees only an increase of a factor of four (since the signal it sees has attenuated only by a factor of the distance to the second power $(d^2)$), its associated technology need only increase by this much with a much lower concomitant lower cost than that required by the speed detector system. Obviously, this disparity between the signals seen by the speed detector and radar detector increases with distance and is strongly to the advantage of the vehicle operator intent on early illuminator detection and avoidance of speed detection.

It is possible to reduce the severity of some of these problems by simply increasing the amplitude of the signal generated by the speed detector. Unfortunately, such power increases begin to encounter other conflicts, some of which are regulatory. For example, units which operate in or very close to the band to which the eye is sensitive must limit power so as not to cause eye damage either in the viewed vehicle or in the viewer. This reduces the target range and signal-to-noise sensitivity of the system. Similarly, even in wavelength bands which are considered to be "eye safe", an increase of power might pose a straightforward thermal risk to the speed detection operator or those in its immediate vicinity due to the relatively high power density of a (usually) coherent and monochromatic light or radar beam. As a result, safety conditions force the design to accommodate inadvertent and unfortunate beam deflections which might otherwise illuminate and cause damage to personnel or other equipment. Thus, for a given signal level detection capability, the ultimate range of a detector system is limited at least to a power level well below that at which thermal damage can occur.

Health risks unrelated to eye damage are another possible downside to increasing power. Recently, operator health concerns have developed as another problem for radar units. Several, court actions have occurred claiming the potential for radar energy to induce cancer in the operator. This, as well as the concerns with other forms of electromagnetic radiation are not yet fully accepted, but do create an additional legal concern with the use of radar.

The ideal, high performance, high reliability speed detector would avoid the problems of the existing art by maintaining the illumination beam intensity well below that which might cause concerns with operator and other personnel safety, by minimizing the amplitude of illumination radiation detected by the target vehicle radar/LIDAR detector(s) to reduce the detection avoidance response time of the target vehicle operator(s), by maximizing the speed detector's relative signal to noise ratio or RSN (speed detector SN divided by the radar/lidar detector SN) over that achievable by currently implemented speed detector systems, and by extending the operating range.

SUMMARY OF THE INVENTION

The subaperture, enhanced target return speed detection technique described below solves the problems of the prior art by improving the speed detector's signal collection efficiency and signal to noise ratio while reducing the relative signal detection efficiency and signal to noise ratio of the vehicle radar/lidar detector. This relative improvement is particularly important because the vehicle radar/lidar detector has historically, had the significant signal to noise advantage of being illuminated by a very much higher signal level than that received by the speed detector, itself. The present invention incorporates features inherent to the target vehicle, and beam manipulation to improve the relative signal to noise ratio (RSN) and to safely achieve effective covert detection.

These improvements are accomplished by substantially eliminating overfill of the vehicle or target angular subtence (and preferably subtence of a target vehicle enhancement feature) along at least one axis perpendicular to the beam direction, by introducing the illumination of the target vehicle or object in a manner least likely to encounter a vehicle radar/LIDAR detector, and by selecting radiation characteristics (wavelength and polarization which are not readily transmitted to or detected by a vehicle radar/LIDAR detector. The target subtence is the angular subtense of one axis of the apparent cross section of the target as viewed from the speed detector). The best case is to confine the beam along two orthogonal axes to the subtence of at least one target subaperture (eg. a subaperture within the subtence of the target FFOV subaperture) artifact or enhancement feature which exhibits enhanced signal return, while avoiding those portions of the target aperture which are likely sensitive to illumination and subsequent illumination detection (eg. away from a target radar/lidar detector).

These steps are summarized as the generation of a beam of suitable radiation (the radiation of energy), using a wavelength and polarization and beam positioning combination which minimizes the likelihood of activating a target radar/lidar detector, the manipulation of the illumination beam geometry and temporal and intrinsic characteristics to place a substantial fraction of the beam within the subtence of the target (along at least one axis) to minimize overfill loss, and the propagation of the beam to a subaperture portion of a full field of view or interrogation region within which target object characteristics are to be measured, control of the manner of introduction of the beam onto the Full Field Of View (FFOV) target subaperture (the subaperture, within the speed detector's viewing area, which contains the target) to assure effective covert operation, the correct identification of the desired target and maintain covert speed detection and the constraint of the illumination location on the target for a period of time sufficient to determine one or more target motion or spatio-temporal characteristics in a fully or effectively covert manner.

The essential functioning of the invention comprises the generation of radiation, the subaperture manipulation of radiation within a full field of view, the application of tagging to at least one subaperture region with a method of determining its illumination subaperture within the FFOV, the propagation of a portion of the radiation to a region in space which may contain a target object, the localization of the beam to constrain at least one axis of the beam to be substantially within the angular subtence defined by the target object (and preferably within the angular subtence of a target enhancement feature), the maintenance of illumination within this constrain for an appropriate period of time, the bouncing of a portion of the radiation incident to the target object back through a radiation manipulation system to a radiation sensor, the conversion of this radiation into information about the spatio-temporal characteristics of the target object, and the imaging of the target object for proper identification recording.

The key aspects of the present invention are described in more detail below. Methods of generating and manipulating beams of light, including radar and laser radiation, directing them toward a moving object such as a car, truck or baseball, detecting the radiation which is bounced from the vehicle back to a sensing apparatus, and using this return signal to determine object range and/or speed, are well known to those familiar with the art and are not repeated in detail herein. Given the mature state of the use of electromagnetic radiation to determine such spatio-temporal characteristics accurately and reliably, said details are incorporated only by reference.

Examples are described in the prior art noted above. A specific example as described by Patterson is a source comprised of a single laser diode and driver, an oscillator which modulates the laser, an optical system to form and collimate the beam, an optical system to receive the light reflected from an object, and an avalanche photodiode (APD) to convert the light signal to an electrical signal, and a microprocessor to perform the necessary determination. A detailed electronic design is described which leads to the precise determination of distance, speed and acceleration along the line of sight (along the beam axis).

Referring to FIG. 1, the radiation in this case is a beam of laser light which is generated, manipulated and propagated through an optical system 110 which launches a nominally collimated or slightly converging beam 120 of diameter 2D shown by 115 (along at least one axis), a distance R (140) toward a region 127 within which motion/spatio-temporal characteristics of a target object 132, such as a vehicle or baseball, are to be determined. The nominal perimetral extent of the beam shown in FIG. 1 is indicated by 125A and 125B and forms a spot or subaperture 136 of size 135 is shown to be smaller in size or subtence than the target object 132 near the target plane 130.

The illumination of the target object with radiation whose subtence along at least one axis nominally perpendicular to the beam (in target plane 130) is a key characteristic of the invention. This is to be contrasted with radiation beams of existing speed detectors crafted using the prior art, in which the subtence of a target object is normally substantially smaller than subtence of the radiation beam projection 119, typically delimited by beam edges 117A and 117B in FIG. 1. The launch beam diameter 115 of the invention is chosen to provide an angular subtence which forms a subaperture or spot size "A" 135 near target plane 130, which is a plane near the target object 132 and perpendicular to the direction of propagation or beam path incident to the target, where spot size "A" is nominally comparable to or smaller than the angular subtence of the target object along at least one and preferably two orthogonal axes nominally perpendicular to the incident beam path (eg. in a plane nominally parallel to the target plane). The spot sizes or beam subapertures 136 in FIG. 1 and 152, 165, and 160 of FIG. 2 are also the projections of the beam subtenses on the target object near target plane 130 of FIG. 1.

This condition is shown in FIG. 2 where the spot size 152 is a FFOV subaperture (of the speed detector FFOV) in only one axis while 160 is a subaperture of the target aperture 150 in both orthogonal axes. Note that the target cross section 150, as viewed from the speed detector, is both a FFOV subaperture (of the speed detector FFOV) as well as a target aperture which contains target subapertures of its own, such as 155, 160, 165 and 170) Ideally, the spot size is further constrained such that one, and preferable two, beam axes of target subaperture beam spot 165 substantially overlap and are comparable to or smaller than the angular subtense of at least one target signal enhancement feature 170 incorporated as part of the target object. In the case shown, the enhancement feature is a vehicle license plate covered with a retro-reflective material. Note that all of the beam spot apertures shown, 152, 160, and 165, illuminate the target object while avoiding illumination of a region likely to contain an illumination detector 155 (such as a LIDAR or RADAR detector).

Radiation returning from the target is collected and processed by the speed detector in optical system 110 to determine one or more target spatio-temporal characteristics such as speed. Additional radiation from the target is also processed by the system to form an image of some portion of the target, such as the license plate, for identification purposes.

To avoid overfill over the entire operating range, the beam must be constrained in some manner. Thus, rather than overfill the target as has been done in other motion characterization schemes, the beam is essentially focused throughout its operating range to an "on-target" spot size which is comparable to (typically no more than three times larger) or much smaller (in at least one dimension) than the target. This has two beneficial effects, an increase in the fraction of launched energy that intercepts the target vehicle (and thus a greater return signal to noise), and a greatly reduced amount of energy in that portion of the beam that may still overfill the target. In the ideal case noted earlier, the small dimension of the one or two dimensional subaperture is reduced to a size considerably smaller than that of the target such that one dimension is comparable in scale to that of a license plate or other signal enhancement feature of the target. In this case, because the return signal amplif enhanced both by using an enhanced reflecting feature on the vehicle and the maximization of the beam energy within the area of this enhancement feature, the return signal to noise ratio is greatly improved during the period of illumination. The implementation of a small beam subtence optical system of this nature which maintains a small dimension or beam waist over an extended range is well known to those familiar with the art. For example, under favorable conditions, the beam size from a nominally 10 cm diameter, visible light, illuminator aperture will not exceed the size of a license plate over a range of almost 10 kilometers.

Note that the present invention offers increasingly advantageous performance properties as the beam spot size is reduced from the nominally size of the target to a size comparable to the enhancement feature. In the former case, reducing the beam spot or illumination region to a size comparable to the target aperture increases the signal to noise ratio by reducing overfill effects such as inefficient power use and false return signals from non-target sources. Then, substantial additional improvement is achieved if the beam geometry is further constrained to emphasize illumination of a target subaperture enhancement feature such as a vehicle license tag or a partially reflecting vehicle light. The latter further improves relative signal to noise by using the enhancement feature's improved reflectivity/ bidirectional reflectance distribution function (BRDF)/area product (described below). Both aspects of subaperture improvement are new to the field.

Other aspects of beam manipulation include extrinsic features such as the method of FFOV spatial and temporal interrogation (introduction of radiation to FFOV subapertures) as well as intrinsic features including wavelength and polarization selection. In the interrogation case, the already geometrically formed beam approaches the target aperture in such a manner that it is least likely to activate a target radar/lidar detector such as 155 in FIGS. 2 & 3. Since the most common location for a radar/lidar detector is within the vehicle passenger cabin (usually above the bulk of the reflective portion of the target and as well as above the license plate), FFOV subapertures in the spatial region near the target are interrogated starting from below the license plate for a passenger vehicle.

The method of illuminating a large region of space within all or part of a FFOV in a manner which is not likely to illuminate a target sensor 155 is shown in FIG. 3. Although a large angular region of space 210 (called a full field of view or FFOV) is searched, the beam spot 205 illuminates only a small fraction or region of the FFOV 210 at a time. This fraction may be one or more single subapertures or one or more groups of subapertures, called subarrays. Thus, by judiciously introducing the beam spot to different FFOV subapertures, different regions can be monitored at different times. In the case shown in FIG. 3, the beam, comprising a single subaperture, is scanned laterally and in an upward manner in FIG. 3 along a roughly serpentine path 200 and in a direction shown by the arrow 215 which at the time shown in the FIGURE is just about to scan across the license plate of the vehicle to the right. Note that the beam scans regions well away from the target radar/lidar detector 220 (of any vehicle on the road) before encountering the desired enhancement feature 225. Any vehicle target radar/lidar detector 220 which is eventually illuminated has already been "speed detected" thus achieving effective covert speed detection of many vehicles within the FFOV.

Similarly, if the beam is constrained to be elliptically shaped with a very large ratio between the long (horizontal) and short elliptical axes, (such as beam spot 152 in FIG. 2), and if the beam angle is increased from the bottom to top of the FFOV, the beam will approach the vehicle upwardly from the direction of the road surface. Since this is the direction furthest from the window area which is likely most sensitive to illumination (eg. from a "radar detector" positioned within the vehicle cabin), it is the direction which is least likely to activate the detector.

Note that the introduction of the beam to the target aperture is a relative angular action. It is important only with respect to the frame of reference defined by the FFOV. This means that either or both the target can move with respect to the beam spot or the beam spot can move with respect to the target aperture. The effect is the same.

An example of the target moving with respect to the beam spot is shown in FIG. 4. A speed detector 260 is placed at an angle 255 with respect to the direction of traffic. The detector emits a beam with leading edge 270A and a lagging edge 270B. A vehicle 280 moving from the right to the left will intersect the beam first along edge 270A. Assuming that the majority of the signal that is bounced back to the speed detector comes from the front license plate (typical of an enhancement feature), useful signal return will occur as the vehicle travels approximately a range of length "L" (within which at least half the plate is illuminated), shown as 275 in FIG. 4, outside of which the vehicle is effectively outside of the illumination region. Referring to FIG. 2, this case is equivalent to vehicle 150 passing from the top to the bottom of a FFOV defined by a fixed illumination aperture defined by the elliptical beam 152 shown.

Analysis: As noted above, a key aspect of the invention is the improvement of relative signal efficiency over the prior art. The is substantially due to the reduction of overfill. An analysis of the impact of this improvement follows for the case utilizing one or more target features which exhibit higher signal return efficiency than the average of the overall target aperture. As mentioned earlier, one such special feature is already required on motor vehicles in most states—a retro-reflective license plate. A retro-reflective material is applied to most license plates to enhance visibility under adverse conditions to more easily assure vehicle identification by law enforcement agencies.

When the beam is concentrated on such a feature, the return signal is further and selectively enhanced. Thus, rather than depending upon scattered light (which varies roughly as the inverse of the distance to the fourth power), or a rare fortuitous specular reflection, as with a radar or normal NIR return, the signal return is preferentially enhanced both in amplitude and return direction. The advantage of this retro-reflection characteristic is shown in FIG. 1. In the case shown, the target object 132 is not oriented to specularly reflect the illuminating beam 120 directly back to system 110. Thus, most of the energy incident to the target object is bounced away from system 110 and can not be used for speed detection. This is not true of a retro-reflective material, however, since such materials have the property of selectively bouncing radiation back along the incident path. Thus, radiation hitting such a feature, under the proper conditions does achieve an enhanced return signal.

An analysis of the advantage of the present invention over the state of the art is given below for illumination of a subaperture comparable in size to a typical motor vehicle. The result is shown in FIG. 5. It conservatively assumes a loss (L) of 50% from the illumination signal generator, through the optical elements and to the plane of the vehicle, an overfill radius of 3 vehicle widths at a distance of 100 meters (as well as uniform illumination, on average, within this circle), an effective reflectivity (R) of 10%, a bidirectional reflectivity distribution function (BRDF) value which is Lorentian and normalized to unit reflectivity, an effective vehicle area of 1×2 meters, and a detector collection aperture diameter of 4" (0.1 meter).

The above assumptions are typical only and do not define the limits of the present invention. They are intended only to exemplify the dramatic improvements offered by the invention in a specific case as compared to the performance of the state of the art. In the example chosen for this analysis, the beam geometry from an illuminator incorporating the prior art is typified by beam edges 117A and 117B which overfill the target aperture. On the other hand, the limits of the beam used in the invention, 125A and 125B, do not substantially overfill the target aperture in all axes.

Equation (1) provides a means to compare the relative signal to noise ratio of the standard and improved techniques. It is in a general form applicable to both concepts and relates the amount of signal that is collected for speed analysis (Pc) to the amount that was initially generated or emitted (Po) from the source. The relationship is defined by the amount of loss (L) that occurs during the generation and transmission of the signal (power emitted/source power), the fraction of the signal (F) in the plane of the target that intercepts target object aperture 150 of FIG. 2—(generally unity for subaperture illumination or the ratio of the object area to the beam area if not subaperture illumination), the transfer efficiency which is the ratio of the power returned per unit solid angle to that incident to the object or vehicle (a function of the average reflectivity and bidirectional reflection distribution function product of that portion of the target returning radiation back to the speed detector, the distance (D) between the emitter and target, the effective collection area of the emitter (typically $7\pi r^2$ for a circular collection aperture of diameter r, and any losses (L') between the collection aperture and the sensing apparatus used to convert the signal to speed information.

$$Pc=Po(L)F(Xfr)SA(L') \quad (1)$$

For the standard case, two equations are required since either subaperture or overfill illumination will occur depending upon the value of D. The distance at which the illuminating beam approximately fills the aperture defined by the vehicle or object as viewed by the illuminator, is called the critical range or "$D_c$".

Short Range Case ($D<D_c$) For short-distances, $D/D_c<1$ and the beam is comparable to or smaller than the target or object angular subtense. In other words, little or none of the beam misses the target and the standard case is similar in operation to the covert/enhanced case where the fill fraction (F) is close to unity. However, this occurs only over relatively short distances (a few meters for Radar and typically 50–70 meters for LIDAR). The nominal form for the short range case is given by equation (2) where the fill fraction is assumed to be unity.

$$Pc=(Po)L((R)(BRDF))SA(L') \text{ Standard \& Enhanced Short Range Case} \quad (2)$$

In the short range case, the transfer function is simply the average product of the target's BRDF and reflectivity. In addition, while very rough surfaces exhibit a smooth distribution of reflected energy over a full $2\pi$ steradian solid angle (giving a nominal BRDF value of $2\pi$/steradian), most manufactured surfaces, such as those found external to vehicles, tend to be polished and quite smooth. This means that most of the incident radiation is reflected specularly and very little contributes to off angle scatter. Compared to the value for a Lorentian surface, the scatter per steradian at angles well away from specular is typically down by several orders of magnitude.

For an automobile, the BRDF is typically on the order of 0.01–0.0001 in the visible and near infrared region, and is chosen here to be 0.001/Str for comparison purposes. In addition to the BRDF, the effective reflectivity must be included (eg. the fraction of incident energy that is not absorbed). Typically for vehicles with darker paint, this value is in the 0.05 (5%) range. The magnitude of the BRDF×Reflectivity product for commercial retro-reflective material typical of the material used for vehicle license plates is on the order of 0.001.

Since the launch attenuation, return solid angle, and return attenuation are the same for both the standard and enhanced cases for $D<D_c$, their relative performance is given by the ratio of the remaining terms. The enhancement ratio (Es) or the ratio of Pc(Enhanced)/Po to Pc(standard)/Po is given by equation (3) for the values chosen above.

$$Es=((R)_e(BRDF)_e)/((R)_s(BRDF)_s)=(0.001)/((0.05)(0.001))=20 \quad (3)$$

While the exact value of E varies from vehicle to vehicle, depends upon the details of the beam and pointing geometry, as well as other variables, the average performance advantage of the enhanced technique can be seen. This advantage is even more evident for ranges beyond $D_c$.

Long Range Case ($D>D_c$): Operation of a speed detection system often includes distances which are in excess of the critical range, $D_c$. In this range, for speed detectors incorporating the prior art, the vehicle subtends an angle which is smaller than that of the beam, and rapidly becomes smaller with increasing illumination range. Thus, the fill fraction of equation (1) must be included. This factor is merely the ratio of the vehicle subtense to the beam subtense (VS/BS), but since both are defined at the same distance, the factor simply becomes the ratio of their areas at that distance. This ratio is the area of the vehicle (VA) (as viewed along the beam path) divided by the beam area at the vehicle or $VA/(\pi(DA)^2D^2))$, where DA is the divergence angle of the beam and D is the range.

$$Pc=(Po)L\{VA/(\pi(DA)^2D^2))\}((R)(BRDF))SA(L') \text{ Standard Long Range Case (Prior Art)} \quad (4)$$

Since there is no critical range for the enhanced case (it always operates in the subaperture range), equation (2) is still operative. And again since both cases encounter that same attenuations and return angular subtense, they can be compared using another enhancement equation which takes the ratio of the two. Although similar to equation (3), equation (6) for the long range must add the fill factor.

$$E_L=((R)_e(BRDF)_e)/((\pi(DA_s)^2D^2))(R)_s(BRDF)_s) \quad (5)$$

Obviously, since the fill factor is always less than one, and rapidly decreases with range beyond $D_c$, $E_L$ will always better (higher) than $E_s$. This is easily seen by rewriting the form factor. Since the beam size is defined such that it is nominally equal to that of the vehicle at $D_c$, F can be defined in terms of $D_c$ as shown in equation (6) to give the normalized enhancement factor of equation (7)

$$F=(D/D_c)^2 \quad (6)$$

$$E_L=((R)_e(BRDF)_e)/((D/D_c)^2(R)_s(BRDF)_s)=20(D/D_c)^2 \quad (7)$$

Thus, the relative improvement of the enhanced versus standard techniques is given by an equation which contains a fixed and a variable component. The fixed value is the relative improvement when both techniques operate with the advantage of subaperture illumination (ignoring alignment and maintenance issues). The variable component shows the additional advantage of the improved technique at large ranges. This advantage is shown in FIG. 1 for two values of $D_c$ which bracket the range of typical vehicle conditions ($D_c$=50 and 100 m).

The signal to noise advantage of the present invention is shown in FIG. 5 which plots the logarithm of the ratio power collected by the speed detector to the power collected by the sensor detector as a function of distance between the speed detector illuminator and the target. Over the range shown, the invention provides improvements of over one to eight orders of magnitude over standard techniques. This means that the present approach allows for a much lower illumination signal power for the same collected power (thus reducing the detectable signal level available to the vehicle sensor detector) and allows for a great increase in the range of speed detection). Obviously, this greatly reduces the probability of detection by a sensor detector attached to speeding vehicle.

This provides two significant advantages. First, it enables an enormous signal enhancement as distance increases, thus increasing range and reducing the amount of beam energy required for efficient operation. Secondly, it dramatically reduces the signal to noise advantage held by the target radar/lidar detector associated with the vehicle. The above analysis shows that the speed detector and target detector signal to noise values are comparable under many conditions with the present invention, rather than different by several orders of magnitude (in favor of the target) as is currently the case. In addition, since the illumination power seen by the two is comparable, only modest improvements in signal detection performance are required to allow the speed detector to "see" the vehicle before the latter can respond, or even realize that it has been seen. This is far different for the prior art. The signal reflected to the speed detector region is differentially attenuated by a factor very much smaller than the several orders of magnitude in current designs.

Thus, the speed detector's relative signal-to-noise ratio is greatly improved (and a great saving in power is achieved) because a.) the signal returned to the speed detector is attenuated comparably to that perceivable by the sensor detector (rather than at the usual much higher rate) b.) and very little incident power spills beyond the plate region to the vehicle cabin (and sensor detector). Thus, advantages of the invention over the prior art include improved eye safety for both the operator and targets, extended range, reduced illumination power requirements, and improved covertness.

The more efficient use of illuminating power is only part of the covert motion characteristic determination technology package. While the reduction of illuminator power (compared to current techniques) is important, the localization process further limits unwanted detection by reducing the amount of lateral spill over at distances away from the centroid of the illumination spot(s) intersecting the target.

Additional covert capability is achieved by minimizing the overfill of the enhancement feature so that most of the light incident to the vehicle, illuminates the enhancement feature (usually the license plate) and very little illuminates portions of the vehicle sensitive to such illumination for purposes of defeating the performance of the speed detector and/or which might compromise safety. The reduction in illuminator beam size not only increases the fraction of the incident beam which is fully retro-reflected (as opposed to that which misses the enhancement feature (or "Cooperative-Target") and is only inefficiently scattered back to the Speed Detector), but it reduces the amount of radiation which can be detected by the sensor detector.

The degree of covert detection is given by the relative level of signal that enters the vehicle cabin and which can be detected by a vehicle sensor. Current technology simply floods the region of the vehicle with radiation which is relatively constant over the nominal width of the vehicle. Thus, the signal that is returned to the speed detection unit is usually much less than the signal level seen by the target's illumination detector (radar or LIDAR detector).

The signal used in covert speed detection, on the other hand, is by definition a "sub-aperture" beam which drops rapidly in intensity with distance away from its centroid (the point through which a straight line of any orientation can be drawn which separates the beam into halves containing equal amounts of beam energy). Thus, for a suitably small beam spot size, typical of that used for present invention, very little time averaged power is found at large radii from the center of the beam (at least along one axis perpendicular to the beam axis).

The advantage of this invention can be shown using a physical optics model to determine the variation of beam intensity as a function of distance from its centroid.

Under ideal conditions, it is well known that the intensity of a well conditioned beam, directed to a remote target, is reduced nominally by the number of intensity peaks (of an Airy diffraction pattern) away from the target. Typically, as shown below, this reduction provides as much as several additional orders of magnitude advantage to covert detection.

The reduction in signal level from the peak is determined by the number of Airy disc maxima between the beam centroid and the senor detector, as defined by the square of the ratio of the first order Bessel function divided by the angular spot size. More specifically, the intensity of a Fraunhofer diffraction pattern (assuming that the target is the focal plane in this case) of an ideal beam varies as some function of the angular distance from the beam center (x) as the square of the ratio of the first order Bessel function (J) of this angle to the angle, itself. The exact equation is well known (ref. 11. J Goodman, Introduction To Fourier Optics, McGraw Hill, 1968) to be of the form shown in equation (8).

$$I=(2J(\pi X)/(\pi x))^2 \quad (8)$$

The intensity, as a function of distance from the center, exhibits its first zero where x=1.22 (L z/d), where $\pi$ is the constant defined by the ratio of the circumference to the diameter of a perfect circle. L is the wavelength of the illuminating radiation. z is the distance between the speed detector and the target, and d is the diameter of the speed detector's optical aperture. The first, second, and third maxima in intensity occur at x values of 1.635, 2.679, and 3.699, and have intensity values (when normalized to the intensity of the central peak (=100%)) of 1.75%, 0.42% and 0.16%, respectively.

For a license plate which is 4" (10 cm) high, and a beam size is chosen such that its upper and lower zero positions (where x=1.22) are also 4" apart, then the third maximum will be (3.699/1.22)(2")=6.06" above the center of the plate. Since the distance from the plate to the rear window of the vehicle generally is many times this value, it is obvious that the intensity of the beam in this location is well below 0.001 of that at the plate. Thus, even while the speed detector is illuminating and determining the vehicle's speed, very little energy is deflected toward the vehicle detector. Even when ideal "seeing" conditions aren't met, the use of a subaperture spot obviously reduces lateral sensor detector intensity significantly below that of the peak intensity at the center of the illuminating beam. This is to be compared to current technology in which the illuminating intensity is relatively constant over a large region in the vicinity of the vehicle.

Enhancement features are not limited to retro-reflective license plates. Other vehicle features can also provide significant retro-reflection enhancement. For example, external lights such as stop lights, turn signals, and front lights can provide some enhancement. Also, special high efficiency retro-reflecting or pseudo-retro-reflecting devices (with retro-reflection in only one axis) can be incorporated as cooperative targets. For example, certain agencies may incorporate such features within the target aperture of their vehicles for their own benefit. Or civil agencies may impose the requirement for such features in general use.

The selection of the proper wavelength and polarization is chosen further to limit the signal's detectability by the target to such a point that the speed detector can illuminate, track, and reliably determine a vehicle's speed well before the vehicle's detector can warn the operator to respond. For example, because the plane of most vehicle windows is tilted at a significant angle from the vertical, usually to improve aerodynamics, their reflectivity is polarization dependent. It is well known that for uncoated specular materials, the S polarization, whose electric field vector is perpendicular to the plane defined by the incident and reflected light rays, exhibits higher reflectivity than for P polarization, which is oriented at right angle to the S polarization. As the window tilt angle is tilted further and further, the S polarization reflection increases significantly and thus reduces the amount of transmitted power available to a detector within the vehicle passenger cabin.

Depending upon the illumination environment (vehicle window type, tilt angle of vehicle windows, viewing angle), the speed detector's beam polarization can be modified to improve the speed detector's relative signal-to-noise (RSN) by minimizing the amount of beam power which is not reflected from the vehicle windows. Since the optimal polarization conditions will change based on the type of object being viewed and the relative angle of view between the speed detector and the object, the polarization of the illuminator may be varied with time to minimize transmission through the dielectric media (usually glass windows in the case of a moving vehicle). For a beam illuminating either the rear or front of a vehicle and parallel to the vehicle's travel direction, the S polarization is in the horizontal plane.

Wavelength is similarly used to attenuate the amount of signal available to the vehicle sensor. Proper selection of the Beam wavelength can further reduce the Detector's signal-to-noise by operating in a region which exhibits reduced Target signal to noise. Here, the wavelength may be selected for significant window attenuation. Both the window glass and the organic sheet material used to form safety glass exhibit reduced transmissivity in certain portions of the infrared spectrum. Because most silicate glasses become opaque above the 2–4 micrometer range, a beam wavelength of at least 5 micrometers would essentially be blocked by the Vehicle windows. When illumination beyond this range is used, little or no signal is transmitted through the window to be detected within the cabin. As with polarization control, a reduction in signal transmitted through the windows to a radar/lidar detector in the vehicle cabin results in a substantially reduced signal (and signal-to-noise) when compared to the signal returned to the speed detector. Any such reduction of target RSN increases the time and probability of the speed detector detecting and measuring the target speed before the target vehicle becomes aware of such detection and can successfully respond. Thus, illuminators in this wavelength range are totally covert to the vehicle radar/lidar detector within the vehicle cabin.

The invention entails the placement of the beam or interrogation of a region of space called a full field of view (FFOV) which contains at least one FFOV subaperture to which the beam is directed. As noted above, an interrogated subaperture may be continuously or intermittently illuminated.

Generally this involves the relative scanning of the beam in one or two (or more) axes (or in some non-rectilinear fashion throughout the FFOV) until the return beam characteristics indicate that a target has been found. Several implementations include, but are not limited to, i.) passive scanning, in which the vehicle passes through a beam which illuminates a relatively fixed, narrow angular subtense, ii.) active beam scanning, in which the illumination beam centroid is moved continuously, or intermittently within a full field of view angular range, part of which encompasses at least a portion of the target, and iii.) array interrogation, wherein one or more beams (of a multibeam array) are assigned angular regions of illumination, and are activated at various times to interrogate their regions of responsibility .. and iv.) any combination of the above.

Beam scanning or rastering technology is well known to those familiar to the art. Mechanical methods include the use of two rotating mirrors which scan the beam in orthogonal directions and non-rotating oscillating mirrors which rotate through an angle of less than 360° about an axis within the mirror plane. Examples include the ubiquitous laser light show which often uses both scanning and rotating mirrors to raster laser beams over large regions of a viewing surface such as the inside of an auditorium, and grocery store scanners. One and two dimensional raster systems are relatively inexpensive and are common in commercial equipment.

An example of passive scanning is the use of a beam is a fixed FFOV and fixed subaperture beam which illuminates a narrow depth but full width of a roadway from an elevated position, such as a bridge or sign, such that all vehicles traversing the highway must pass through the beam as shown in FIG. 4. Although the beam itself doesn't move, scanning does occur because relative movement occurs due to the vehicle's motion. In addition, because of the small angular extent of the beam along the direction of the roadway, and the concomitant increase in efficiency, low illumination power can be used both to save energy during operation and to minimize the probability of detection before successful speed measurement.

As an active scanning example, a focused circular beam is rapidly rastered in the horizontal direction while scanning upward more slowly to assure that the target is addressed only from the bottom as shown in FIG. 3. In this manner, when using a subaperture beam, little or no radiation can enter the vehicle window which is usually located above the license plate. An alternative or complementary approach is the use of a non-circular beam, such as a flattened ellipse, which may or may not be laterally scanned, which is scanned in a direction nominally perpendicular to the long axis of the beam until a signal is received. An example is a beam which is nominally one or two license plate heights high but several vehicle widths wide.

Finally, instead of moving the pointing direction of an individual beam, subaperture interrogation can also be achieved by activating and deactivating subaperture beam sources which individually illuminate fixed subapertures or subarrays within the FFOV with no angular motion of a beam at all. Thus, a beam need not be scanned in the usual sense. Another way to introduce illumination to different subapertures is to overlay An array of subaperture illuminators, such as individual diodes in a diode array, illuminate different subapertures or subarrays within the FFOV which is the optical conjugate of the array. Any single or group of illuminators can be activated at any time to illuminate one or more FFOV subapertures in any sequence desired. The analog of scanning a single beam is to activate and deactivate adjacent illuminators in series. Here, the illumination is is comprised of one or more beams which might or might not comprise one or more subarrays, of which one or more may or may not be scanned (in one or more directions) be scanned at any time (thus offering enormous flexibility in interrogation protocols). For example, a standard or laser diode array can be used to illuminate a subarray of slightly different angular regions near a target and subsequently reassigned to be operated sequentially to emulate a raster scan. Or several subarrays within the FFOV may be emphasized by exclusively activating subarrays which illuminate this locations, such as a pair of tunnel entrances, while ignoring regions of little or no anticipated activity. Multiple subarray interrogation also improves the capability and accuracy of spatio-temporal characteristic measurement from a moving platform. With one subarray illuminating a target, another subarray illuminates a reference target, such as a stationary roadway sign, to determine its speed. This speed (which the speed of the moving platform) is then vectorially subtracted from that of the target to obtain the true speed of the target with respect to the road.

One advantage non-mechanical scanning is improved reliability (fewer moving parts), and operational flexibility (raster areas, sizes and rates could be changed easily and at electronic speeds.) Non-mechanical source beam interrogation offers additional advantages, as well. Once the license plate or other co-operative target has been detected, the raster scan FOV may be reduced in size to more efficiently illuminate the plate. For example, if the full array is comprised of a field of 100×200 illuminating elements which subtend a certain angular region which includes the vehicle, the number of active elements would be reduced to, perhaps, a sub-array of 3×3 elements centered on the subaperture exhibiting the highest signal return (and repositioned as the peak subaperture moves). Any relative motion of the target within the FFOV (or subarray) is detected by an increase in the relative signal received by one or more of the adjacent detector pixels (conjugate to the corresponding FFOV subapertures), which allows the device to laterally shift to a new set of interrogated pixels within which the beam is more precisely centered. This greatly reduces the probability of false return signals and accommodates operator motion or other forms of induced beam motion which might otherwise degrade aim point maintenance, while maximizing the time average signal return. It also greatly speeds performance since because only a limited number of subarrays (usually one) are active at one time, a greater proportion of detection and analysis time can be spent in target evaluation than in scanning uninteresting regions of the FFOV. While electronic scanning does offer advantages in speed and reliability, the concepts described apply to mechanical scanning as well.

Note that each subaperture and subarray is implicitly or explicitly tagged with a feature to discriminate among the different subaperture beam locations within the FFOV. For example, each can be modulated with a unique spatial, temporal, wavelength and/or polarization feature to discriminate the energy returned from its reflections from those of another beam (or from the same beam at a different time or pointing condition). Or each subaperture can be tagged by its angular position within the FFOV which is mapped to a conjugate location on the speed detector radiation sensor surface. Some monolithic detectors can determine centroid position within the detector collection aperture with high precision. Thus, since the relative position of each sub-beam is known, the location of the target mediating this enhanced signal is also known. For example, in the single scanned beam case, the beam may be temporally modulated during the entirety of its full FOV scan such that subsequent analysis of a strong target return signal will indicate the state of modulation and thus, its location within the FOV scan pattern. Such modulation thus provides precise target location information while using a single illumination beam and a non-imaging radiation detector. Methods of beam modulation and modification are well known to those familiar with the art. Within the context of the invention, tagging means the imposition or adaptation of any form of intrinsic or extrinsic subaperture beam modification which allows the speed detector to differentiate return radiation from one subaperture from that returned from another subaperture.

Spatio-temporal Characteristic Analysis: An additional feature of the invention includes the determination of any time derivative of the spatial location of a target object in any direction relative to the prime axis defined by the line between the speed detector and the target. Specifically, these spatio-temporal characteristics include distance, the change and direction of change of the target along and perpendicular to the prime axis (speed), the change in speed along and perpendicular to the prime axis (acceleration), and any higher time derivative desired. Most speed determination devices measure either the axial speed (along the sighting axis or axis of viewing defined nominally as the line between the viewer and the object being viewed) or transverse speed (perpendicular to the sighting axis), but not both. Obviously, the measurement of speed along only one of these axes will not provide the true speed, which is the vector sum of each of its components. Since both the axial and transverse motions are always orthogonal, the true absolute speed is determined by their vector sum, which is simply the square root of the sum of the squares of the two speeds. For example, if the object or vehicle is traveling at a speed of 90 mile per hour along a straight road, and its speed is measured using a Radar or LIDAR speed detector which views the object along a path which is at an angle of 45° from the path defined by the direction of the object, these standard speed detectors will only record only that component of the speed which is along the line of sight which is a much lower, legal speed.

To avoid this type of error, current techniques require that the line of sight of the operator to the object must either be along or perpendicular to the vehicle's path. The present invention, however, can determine the true speed by simultaneously measuring both the axial and transverse components. In addition, to enhancing the accuracy of the speed measurement under normal viewing conditions (usually along the direction of a roadway toward the front or rear of a vehicle). This technique increases the range of accurate measurement to angles which include a substantial view of the side of the vehicle. Such information can be useful in determining details of the target's behavior which may be helpful in traffic pursuit or other purposes. For example, a sudden acceleration of a distant target would be measured well before the observer would notice a significant change in speed or distance. With this information, a potentially dangerous chase can be forestalled.

An example of dual axis speed determination concept incorporates a focal plane array to image the enhance target return signal as a "bright" spot at some location of the array. During the scanning or searching phase of operation, the illuminating energy scans a preset region (a FFOV or subarray) until an enhanced return signal is detected. The return energy is focused on the focal plane array at a position corresponding to its source location in real (of object) space (angular tagging). The region of object space being scanned is then reduced to a smaller angular region (subaperture or subarray) which, when reimaged onto the focal plane, may cover only one or a few adjacent pixels in extent. As the object moves across the illuminator's field of view, the position of the reimaged target return signal (or its centroid) also varies such that the speed of passage of the image across the focal plane array can be determined. Then, with a knowledge of the distance between the speed detector and the object, the angular speed can be converted into the object's transverse speed. This value is then squared (multiplied by itself), added to the square of the axial speed (along the bean axis), summed, and the square root of the sum taken to determine the true speed of the vehicle when the lateral speed determination is complicated by illuminator motion, the latter can be controlled in the analysis by using either inertially and/or by using fixed reference reflectors in the FOV. These reference reflectors are typically fixed roadway retro-reflective markers whose motion across the FFOV is used to cancel the speed detector platform motion from the axial and transverse motion of the target.

Under some conditions, such as driving along a rough roadway, it is desirable to reduce the amount of platform induced vibration or motion (which otherwise may degrade spatio-temporal characteristic determination performance). Active and passive, stabilized platforms used to reduce angular variations of an optical axis, are well known to those familiar with the art. Such image stabilization techniques are commonly used in sophisticated binoculars, video cameras, and other viewing devices to maintain an essentially fixed viewing image in spite of angular motion of the device itself.

This technique eases speed detector operation by holding the target at a fixed position in the FFOV image even during speed detector motion (such as during hand scanning of the speed detector to track a moving vehicle). It also improves speed detector performance by maintaining a desired target feature, such as a license plate, at a fixed image location such that imaging quality (for identification purposes) will not be degraded by FFOV motion. Recording or documentation of the image identification may be performed in any manner ranging from high resolution video recording to simple handwritten annotations in a notebook.

Image Identification: As noted above, a feature of the invention is the imaging of one or more target features for identification purposes. Target identification is important both during the speed determination process and during follow-up adjudication to assure that such identification was performed accurately and properly. This is especially important as the invention is applied to ranges well beyond those achieved in the prior art. Because the above described improvements not only improve covert operation but greatly enhance the speed detector's range of operation (both in distance and range of environmental conditions), reliable vehicle identification will become practical at extreme range. Once a speed violation is determined, some aspect of the image of the vehicle (such as the license plate) for identification is recorded.

Image identification requires assurance that the speed detector FFOV and identification imaging paths are coaxial to within a resolution comparable to the subtence of the target. Otherwise, a different object might be incorrectly ascribed the speed of the violator. The use of separate, fully coaxial, and partially coaxial paths capable of such resolution, and even utilizing different magnifications, is well known to the art. Since the Speed Determination Sensing and Vehicle identification determination occur essentially coaxially and contemporaneously, identification and culpability are assured even at great distances, as long as sufficient light exists for speed detection and license plate image recording. Obviously, some night operation requires artificial illumination which might or might not include that from the speed detection illuminating Beam.

BRIEF DESCRIPTION OF THE DRAWINGS

FIG. 3 is a view of the illuminator full field of view with a typical arrangement of target vehicles plus a typical target illumination engagement scheme.

FIG. 4 describes the key aspects of one embodiment of the invention wherein the target object passes through the beam.

FIG. 5 is a plot of the relative performance of the current invention compared to the prior art.

FIG. 6 describes key aspects of an embodiment of the invention incorporating scanning mirrors to radiatively interrogate different regions of a FFOV.

FIG. 8 describes another embodiment of the invention utilizing a linear array of sources.

DESCRIPTION OF THE PREFERRED EMBODIMENTS

EXAMPLE 1

Figure 1:
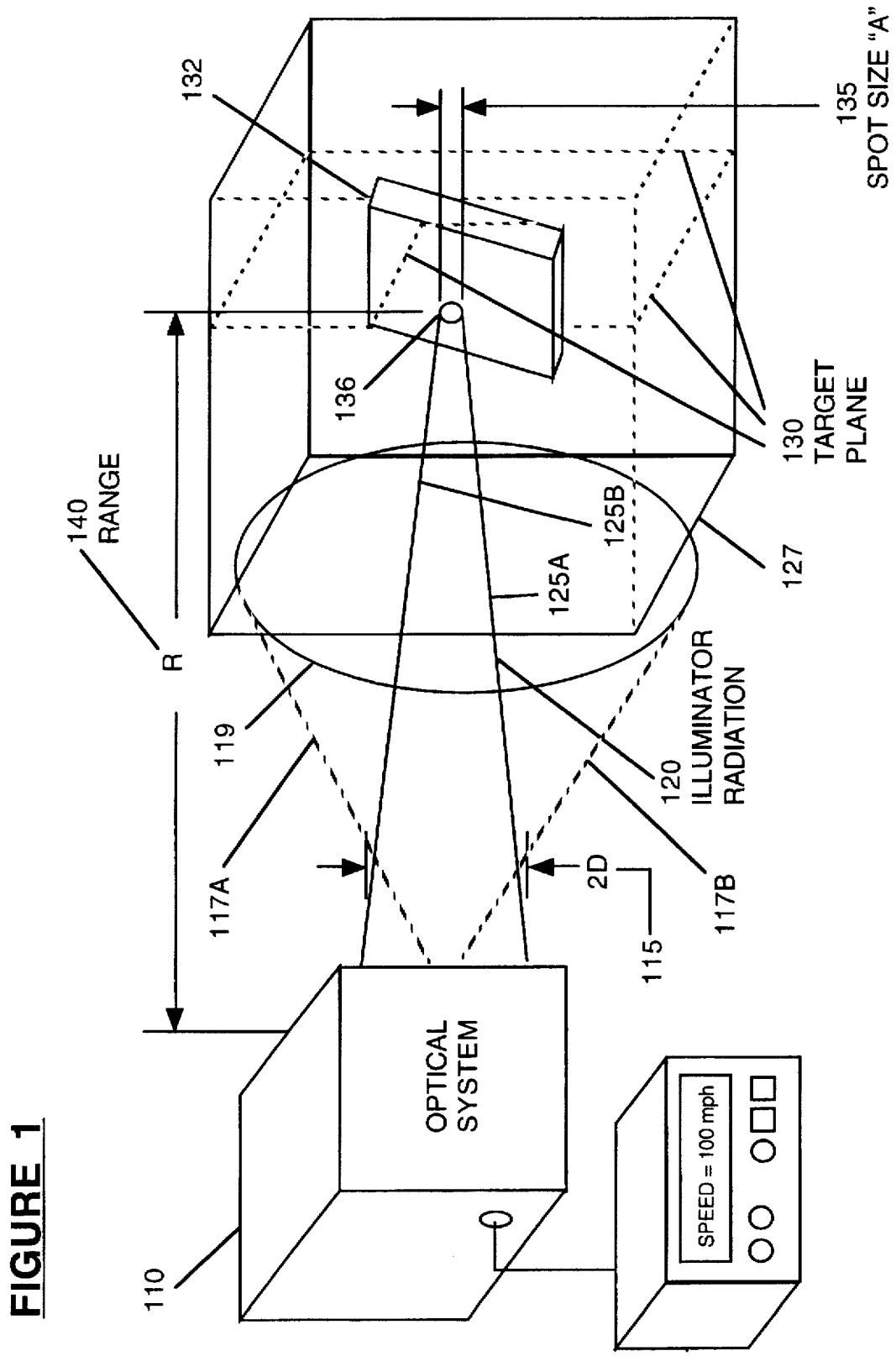
FIG. 1 shows the various components of the invention process.

Referring to FIG. 5, a beam of laser light 305 is generated by illumination generator 300 and propagated through an optical system comprising beam steering mirror 1 (320) to horizontally scan the beam in the target plane plus beam steering mirror 2 to scan vertically plus beam splitter 340 plus lens 345 to represent a zoom lens assembly, which launches a slightly converging beam 350, toward a region 355 within which vehicle spatio-temporal characteristics are to be determined. Standard geometric and physical optic techniques are used to configure the beam to provide a horizontally polarized, nominally target feature supaperture spot size using an eye-safe radiative power of less than 1 mw on average at a wavelength longer than 2.5 micrometers as exemplified by 165 in FIG. 2. The zoom assembly adjusts the angular extent of the FFOV and spot size to accommodate different operating conditions and ranges consistent with seeing conditions and the ultimate range of the system. Prior to leaving the system, the radiation is modified such that each subaperture has a unique characteristic which can be identified by the sensor system after the radiation returns from the target. Although any tagging technique can be used, a specific example for the embodiment being discussed is to temporally modulate the amplitude of the beam at a frequency unique to each FFOV subaperture. (such as chirping which is the continuous monotonic increase of frequency with time).

In a plane nominally perpendicular to the propagation axis of the beam in region 355 as shown in FIG. 3, the beam spot 205, shown in FIG. 3, is caused to traverse a serpentine path 200 designed to illuminate any portion of an angular region defined in extent by the Full Field Of View 210 in such a way that a substantial portion of the beam intersects an enhanced reflection attribute 225 attached to the target vehicle. The serpentine scan path 200 is configured in such a way that the probability of feature 225 overlay by the beam 205 is higher than the probability of overlaying an illumination sensor 220 (or target radar/lidar detector) also accompanying the target vehicle and which is designed to detect said illumination. In the example shown, since it is known that radar/LIDAR detectors, such as 220 of FIG. 3, are usually located within the vehicle cabin and near the upper portion of the cabin to assure a good view, the beam is introduced to the target aperture from the bottom up. In the case shown in FIG. 3, the spot will illuminate the license plate and determine the vehicle speed long before rising to a level of 220.

In the preferred embodiment, a beam spot is traversed laterally across the FFOV with subsequent lateral passes nominally one spot size higher until the top of the FFOV is reached (at which point the illumination raster is reinitiated along the bottom row of the FFOV) or until an enhanced return signal is detected. A monolithic radiation detector is shown which in this case only determines the magnitude of collected power for each tagging condition and thus for each subaperture.

Rastering or interrogation of the FFOV (or one or more selected subarrays or subapertures) is achieved with the use of the two rotating mirrors which scan the beam in orthogonal directions. This technology is well known, an example being the ubiquitous laser light show which often uses both scanning and rotating mirrors to raster laser beams over large regions of a viewing surface such as the inside of an auditorium. One and two dimension laser raster systems are relatively inexpensive and are common in commercial equipment such as grocery store scanners.

Figure 2:
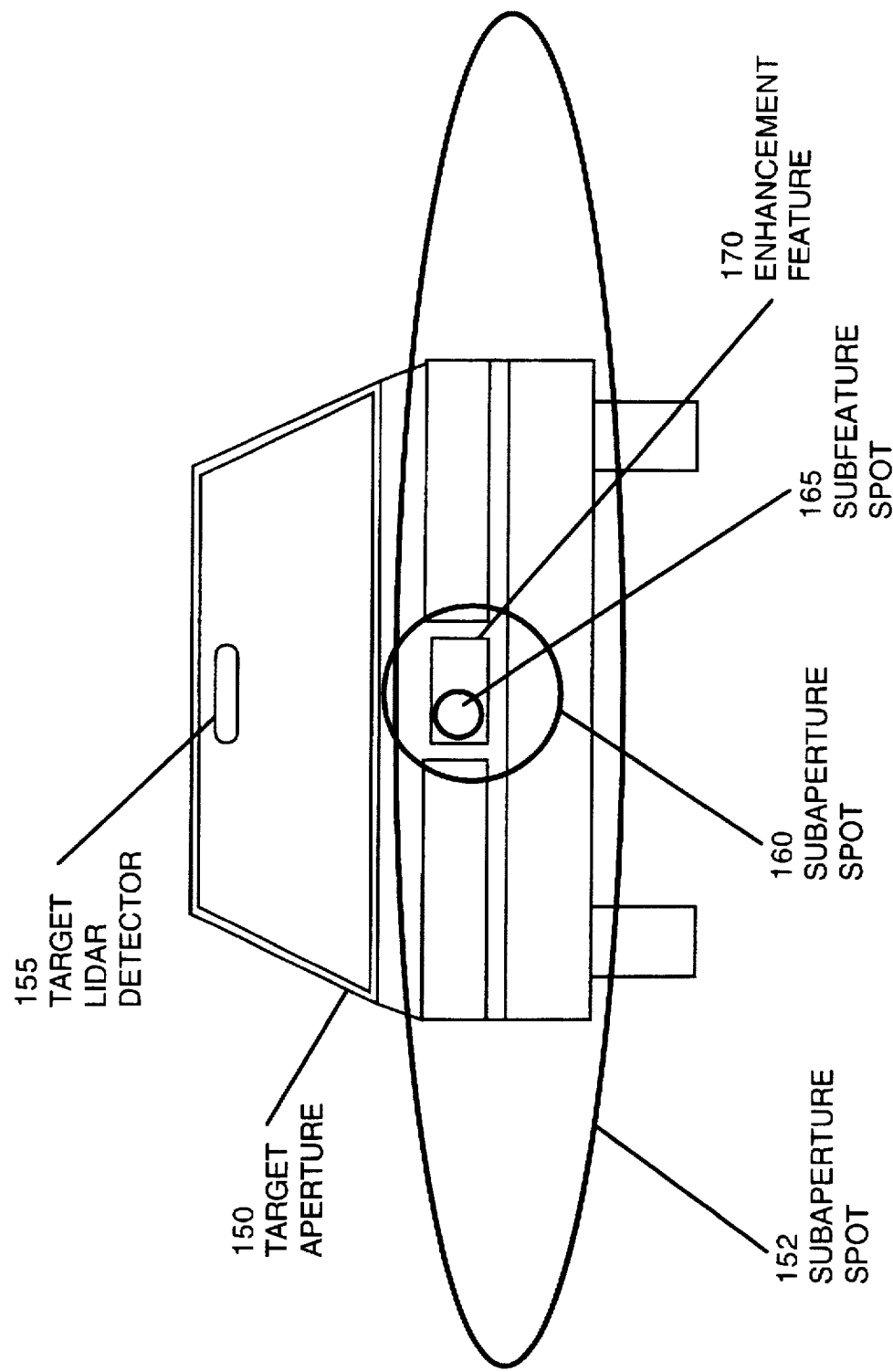
FIG. 2 shows various target apertures and subapertures within the full field of view.

As different regions within the FFOV 105 of FIG. 2 are illuminated, the subaperture containing a license plate provides a strong retro-reflection signal. When the enhanced signal is detected (in excess of a predetermined signal threshold which can be operator adjusted to accommodate varying environmental conditions), the horizontal and/or vertical scan ranges are reduced in a process called localization to a fraction of the FFOV, called a subarray, comprising at least one FFOV subaperture which includes the subaperture of peak signal return. Localization is maintained until sufficient energy has been collected to determine the desired spatio-temporal characteristic(s). Another subarray is located on a retro-reflective highway sign for referencing and used to cancel speed detector platform motion.

A portion of the beam incident to the target is bounced back through the optical system, is partially reflected from the splitter 340 and is imaged as a spot 330 on the focal plane array (FPA) 325. The knowledge of which FPA subaperture (s) detect the high signal return determines the angular tagging which defines the location of the target vehicle within the FFOV. Using techniques well known to the art, the radiation signal is converted by one or more of the array elements into an electrical signal which is processed to determine relative speed and/or distance using a technique such as that described by Wilson. In addition, the beam centroid is determined using well known techniques, to find the precise position of the beam on the FPA. The measurement is repeated at one or more later times to determine changes in spatio-temporal characteristics. Repeated relative speed measurements increase accuracy and determine higher derivatives of speed such as acceleration.

Any combination of tagging techniques such as the use of different time phasing, different wavelengths and/or wavelength modulation for each subaperture, different polarizations and/or polarization modulation, different amplitude modulations with time, and angular can be used. As another example, each full field of view subaperture can be illuminated with radiation which varies in amplitude or intensity with a frequency $F(i)$ where i is a variable name which is unique to each subaperture. Subaperture one would be varied with a frequency of $F(1)$, subaperture two with a frequency of $F(2)$ and so on for all or part of the array of subapertures within the FFOV. Typical frequencies would be 100 MHz for one, 200 MHz for another and so on. The specific frequencies and frequency differences could vary with circumstances but are sufficient for the speed detector to differentiate between them when the illumination from each subaperture is received. The knowledge of the amplitudes of the return signal from the subapertures informs the speed detector as to the location within the FFOV from which the strongest signal(s) return and thus the location of a target object. The differentiation of the amplitude of signals which differ in frequency is well known to those familiar with the art, radio and TV being prime examples.

Once the position of the target is known at a point in time, the time for the location of the peak signal to move a known distance across the FFOV is used to determine lateral speed and direction. This is done by determining the distance between the illuminator and the target vehicle, and calculating the lateral distance moved in the time taken for the centroid to move a resolvable angular distance across the FPA 325. The same is performed for the reference signal after which its spatio-temporal characteristics are vectorially subtracted from those of the target to obtain the true target characteristics (speed components in this case). Finally, the axial and lateral speeds are added vectorially (by taking the square root of the sum of the squares of the two speeds) and the axial speed of the illuminator/sensor platform(s) deconvolved, to determine the true speed of the vehicle.

The conversion of the return signal into an axial speed is well known within the art. Such calculations are achievable by analog and/or digital techniques, as described by Wilson and Patterson. Similarly, the determination of an optical beam's centroid is also well known to those familiar with the art. Precisions to within a small fraction of an imaging element have been described in the literature.

In addition to or in lieu of determining spatio-temporal characteristics, a portion of the image generated by the target, illuminated by the system and/or by at least one other source such as ambient light, is also deflected by 340. This energy is then deflected to form an image 317 used to record at least a portion of the target object suitable for identification purposes. Alternatively, in other embodiments the image is recorded with the FPA.

EXAMPLE 2

Figure 7:
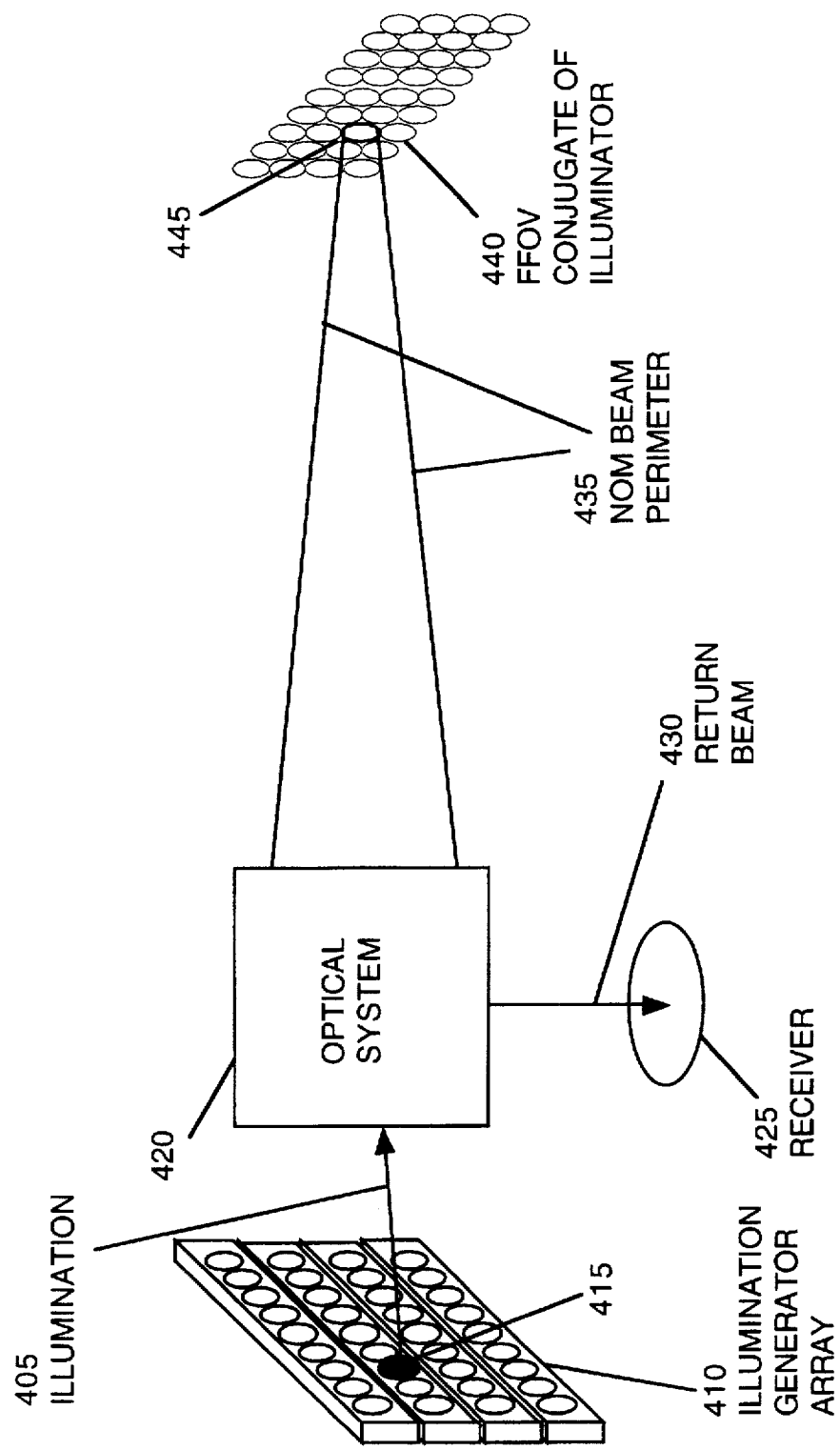
FIG. 7 describes an embodiment of the invention which incorporates multiple radiation sources.

The second preferred embodiment is shown in FIG. 7. It operates in a fashion similar to the first except that beam interrogation is achieved without the use of moving components. Instead of the combination of a single light source, such as an LED or laser diode with a set of scan mirrors as described in the first embodiment, an array of sources is used to simplify both the device's operation and construction, as well as to improve its performance capability and its reliability. As shown in FIG. 7, a two dimensional array of radiation sources 410, diodes in this case, configured by optical system 420 to fill a FFOV 440 with the a conjugate image of the array. Activation of any one source image 415 emits illumination 405 through the optical system 420 along a beam path denoted by 435 to form a beam spot 445 at a location within FFOV 440 corresponding to the source's location 415 within the illumination generator array 410. Obviously, the use of a linear illuminator array is functionally similar to a single axis mirror scanner. Thus, it is apparent that one or both scan axes is replaced by one or more arrays of light emitting sources which are activated in a sequence which successively illuminates different portions of the object aperture in a prescribed manner. If for example, the array is comprised of a set of radiation emitters which can illuminate all portions of the FFOV described earlier, then the same illumination function is achieved. Thus, if the array, illuminates substantially all portions of the FFOV that would otherwise have been scanned by a scanning device using one source, the same FFOV coverage is achieved by either the scan or array interrogation method. However, the array concept provides the advantages of fewer moving parts, illuminator redundancy, greater ease and response rate in adjusting scan rates and sub-FFOV scan areas, including the ability to simultaneously interrogate more than one subarray.

A two dimensional array is used to eliminate the mechanical scan requirement entirely. A typical enhancement is the simultaneous interrogation on multiple subarrays within the object space FOV. For example, if more than one enhanced signal return is identified during a full FOV scan, the illuminators can be adjusted so that only those immediately within the region of each potential target is illuminated and the remaining array sources deactivated until required. With only a small fraction of the original array being activated, the characteristics of the target(s) can be determined both at greater speed and with less noise form nonproductive sources.

The embodiment described here utilizes illumination array 410 to achieve maximum flexibility and to minimize the number of moving parts. Individual 415 or groups of sources are actuated to illuminate conjugate spatial regions, such as 445, in the target plane 440. Each source point 415 corresponds to a unique and well defined location 445 within the full conjugate array 440. Sequential actuation allows the same effective illumination raster of the FFOV as when a single moving beam is employed, but with the advantages of rapid beam localization, the ability to jump instantly to any portion of the FFOV, and when the enhancement feature is encountered, the immediate and precise, metric identification of the location of the feature within the FFOV without the need for an FPA. One and two dimension illuminator arrays are relatively common in commercial equipment such as laser copiers, printers and high optical power diode systems.

As different regions within the FFOV 440 are illuminated, the subaperture containing a license plate provides a strong retro-reflection. When an enhanced signal is detected (in excess of a predetermined signal threshold which can be operator adjusted to accommodate varying environmental conditions), the region of interrogation is reduced to a subarray of nine subapertures centered on the subaperture exhibiting the strongest signal (although under some conditions different sized and shaped subarrays are used) Each illuminator subaperture in the vicinity of the enhanced signal region is interrogated to identify the spot(s) with the highest signal, thus providing location within the FFOV. When the "hot spot" or subaperture with the strongest signal changes, the subarray is reconfigured to recenter it but activating the processing of illumination subapertures on one side and deactivating others which are no longer within the preset geometry established about the hot spot. The subarray is illuminated preferentially until sufficient signal is received to determine the target's characteristics, and to assure proper identification. The spatio-temporal characteristics and identification imaging are determined in the same manner described in Example 1.

The embodiment also includes simultaneous operation of more than one subarray when conditions permit. In this mode, once a FFOV scan has identified a target location and a subarray has been established, the FFOV scan is re-established except for a region comparable to the subtence of a vehicle at the distance of operation and position to include the already established subarray. If and when another target is found, an additional subarray is established to determine its spatio-temporal characteristics. The separate processing of signals from different subapertures is well known to those familiar with the art.

EXAMPLE 3

Example 3 is the vehicle self scan configuration described in FIG. 4, where a beam continuously illuminates a fixed portion of a region (the highway) through which vehicles pass. Although at first it may seem to differ from the earlier examples, it is the same invention. All embodiments of the invention entail relative scanning or interrogation of a target appearing within a speed detector's FFOV and the use of a beam which, in at least one axis perpendicular to the prime or beam axis, nominally subtends an angle which is comparable to or smaller than the angular subtence of the target along the same axis. In this case, laterally elongated beam spot shown as 152 of FIG. 2, is directed toward one or more traffic lanes as shown by beam edges 270A and 270B of FIG. 4 illuminating a preset portion of the roadway without a vertical scan component. It is operated from an elevated location such as an overpass, so that virtually all passing vehicles pass through the beam and are monitored.

The third preferred embodiment is shown in FIG. 4 wherein one or more target vehicles pass through a beam delimited by 270A and 270B which is emitted from a source 260 at an angle 255 from the direction of travel of target vehicle 280, which incorporates an enhancement feature 265 (such as a license plate, headlamp, or other light reflector) which is illuminated by 260 as vehicle 280 passes through the beam. In this case the beam need not be moved since the vehicle itself performs the "scanning" function by passing through the beam. Since the vehicle traverses the FFOV of the speed detector, however, relative beam interrogation is achieved. Note that the outgoing path from the illuminator to the vehicle need not be the same as the return path from the vehicle to the receiver. View 290 shows the geometry of the beam near the vehicle.

In the case shown, the speed detector 260 emits a beam which illuminates an angular region with a lateral extent which may intersect the road nominally over at least one traffic lane width, but with a (usually much) smaller subtence 278 in the orthogonal direction (also perpendicular to the outgoing beam path). Alternately, the beam could be oriented to traverse the roadway nominally horizontally and at some non-zero angle to the direction of vehicle travel, as well; or the beam could be oriented with angular components of both cases.

As a vehicle passes through the beam, the target object in this case, the license plate is illuminated nominally for distance 275. For a vehicle speed S, the period T, in the case shown, is nominally given by the equation $T=A/(S\cos(p))$, where A is distance 296 in plane 294, which is perpendicular to the outgoing beam path and at the point that the vehicle passes through the beam. S is the vehicle speed along the beam propagation direction, and p is the angle 265. Upon bouncing from the vehicle, the radiation is collected and evaluated by the speed detector or a remote collector oriented to collect the enhanced return radiation just as described in the earlier examples.

Note that the above examples are for illustrative purposes only and other combinations of features are possible to those familiar with the art.

Definitions: The following provides additional descriptions of the key aspects of covert speed sensing.

The term "RADAR/LIDAR Detector" is applied to any device used to detect the illumination or radiation from a speed detection device, and is usually attached to the target vehicle and operated with the intent of speed detection avoidance; e.g. the reduction of speed detector performance reliability. One form of a speed detector is the common "radar detector" used to thwart police radar which "clocks" (or measures) automobile and truck speeds on the highway.

The term "Covert" applies to the use of any or all of the improved speed detector features of the invention the use of enhanced return features such as retro-reflecting plates, subaperture illumination, and controlled interrogation to minimize speed detector illumination, and the use of polarization and wavelength selection control to minimize speed detector illumination, to reduce the ability of a target radar/lidar detector to perform its function by the denial of useful signal intensity or quality.

The word "Target" is a region in space which interacts with incident energy and imparts a change in some of the energy which is deflected from the target and which conveys information concerning the target's spatio-temporal characteristics. The target is a "Vehicle" or "object", which may or may not have an on-board human operator, and whose speed and/or other spatio-temporal characteristic is to be determined by the speed detector. These characteristics include scalar and/or vector information such as position, velocity or speed, and acceleration (and any temporal derivatives of position or distance with time or averages of these with time) along any combination of axes within any selected spatial coordinate system.

The terms "vector", "scalar", and phrases "magnitude of a vector" (which is a scalar), and "vector sum" are terms well known to those skilled in the art. In the simplest case, a location is a spatial coordinate and distance is the separation between two spatial coordinates or locations or points. Speed is the distance traveled within a period of time and a speed combined with a specific direction in Cartesian or angular space is a vector. Instantaneous speed is the derivative of the change in location with time, and higher order derivatives define other forms of spatial change with time. Each of these can be defined in any of three Cartesian coordinates or in other orthogonal and non-orthogonal spaces in other coordinate systems.

The word "Beam" is defined as the illuminating radiation emitted by the speed detector for the purpose of determining the speed of the Vehicle. The radiation may be of any type including electromagnetic, particle, and acoustic.

"Spatio-Temporal Characterization" is the determination of the absolute or relative location and/or state of motion of an object, along one or more axes, with any time dependence, such as speed (which is the first derivative with time of distance) and acceleration (which is the second derivative with time of an object's motion)

"Enhancement Feature" relates to one or more subaperture regions, within the aperture or angular subtense of the target, exhibiting higher signal transfer characteristics (usually a function of reflectivity, BRDF, and area such as the product of the reflectivity, BRDF and area of the feature) than the majority of the remaining angular area of the target. Retroreflection pertains to the preferential reflection of a large fraction of incident radiation almost directly back along its incident direction (somewhat like a cat's eye) and to do so in a manner which is substantially independent of the illumination angle.

Manipulation relates to the spatial and temporal forming of a beam's geometric and other parameters so that it will more likely return a useful level of signal from a target, and it refers to the placement and maintenance of a useful fraction of the beam energy on the target. The forming relates to such pointing independent characteristics such as the beam's shape, size, and energy characteristic features such as wavelength, polarization (in the case of electromagnetic radiation), coherence, temporal energy profile, and spatial energy profile. The maintenance aspect refers to the beam's temporal and directional stability.

Closing

The invention offers significant improvements in the overall performance of speed detectors and other devices used to determine the location and time dependent behavior of remote objects. And, as vehicle sensor detector sophistication improves, speed detector performance can now stay a step ahead in technology since it has the signal to noise advantage. This is just the opposite of the current situation in which new sensing approaches are required to defeat much lower cost vehicle based detectors with improving sophistication and an eternal edge in signal to noise. By using coherent, and even spread spectrum techniques, the improved speed detector will almost always maintain the technology edge. Only vehicle detector systems with much higher costs than the speed detector system will have the hope of defeating the current approach; and even then, if illuminator detection is achieved, such detection will perform only with intermittent effectiveness or may be insufficient to warn the operator in time.

Although the invention has been described and illustrated with respect to exemplary embodiments thereof, it should be understood by those skilled in the art that the foregoing and various changes, omissions and additions may be made without departing from the spirit and the scope of the invention. The invention is defined solely by the claims.

References

1. "LIDAR guns and silicon detectors face off in highway-speed duels"; J Hobbs, Laser Focus World, March 93, p 47
2. Weaver U.S. Pat. No. 3,184,015 of September 64
3. F Berry U.S. Pat. No. 3,689,921 of 5 Sep. 1972 Method and Apparatus for Digitally Measuring . . .
4. J Aker, Geist, F Kittle, and J Berry, U.S. Pat. No. 3,936,824 of 3 Feb. 1976, Method and Apparatus for Digitally Measuring Speed
5. K Millard U.S. Pat. Nos. 4,020,490/4,052,722 of 26 Apr. 1977/4 Oct. 1977, Traffic Radar Apparatus Therefor
6. F Berry U.S. Pat. No. 4,335,383 of 15 Jun. 1982, Method and Apparatus for Digitally Det . . .
7. J Aker and W Goodson U.S. Pat. No. 4,236,140 of 25 Nov. 1980, Traffic Radar Device
8. B Brown, S Correl, J Schrelber, L Mayfield and D Jenkins, U.S. Pat. No. 4,335,382 of 15 Jun. 1982, Traffic Radar System
9. Patterson, U.S. Pat. No. 4,214,243 of 22 Jul. 1980
10. Wilson, U.S. Pat. No. 5,396,510 of 7 Mar. 1995
11. "Speed, Safety, and Radar Detectors", P Cooper, ITE Journal, October 1992, p 17
12. RADAR "LIDAR detection range is far less than that of radar", p 64
13. J Goodman, Introduction To Fourier Optics, McGraw Hill, 1968

What I claim is:

1. A spatio-temporal characteristic determination method of improved reliability comprising:
   the radiation of energy,
   the configuration of a portion of said radiation as at least one energy beam which is directed into an at least one dimensional array comprising at least two subapertures within an interrogation region, said interrogation region comprising the full extent in angular range, sometimes called a full field of view, within which said determination method operates,
   the placement of a substantial fraction of said radiation from at least one subaperture beam within the target aperture, which substantially intercepts a portion of a remote target in at least one axis throughout the majority of its operating range, wherein said axis is nominally perpendicular to the propagation direction of said beam,
   the maintainance of a portion of said radiation within the angular subtense of said target in a manner sufficient for spatio-temporal characteristic determination, and
   the collection and analysis of the radiation returned from said target.

2. The determination method of claim 1, wherein spatio-temporal characteristic includes at least one from group comprising a vector, a vector sum, the magnitude of a vector, and the magnitude of a vector of at least one from the group comprising location nominally within a plane region perpendicular to radiaton propagation axis, location nominally in a direction parallel to the radiaton propagation axis, order derivative of location with respect to time nominally within a plane region perpendicular to the propagation axis, and any order derivative of location with respect to time nominally in a parallel to the radiaton propagation axis.

3. The determination method of claim 1, wherein sequential interrogation, of at least a portion said target array, combined with change in effective relative angular displacement between at least one and at least one interrogated region, said interrogation and displacement eventually enables stantially subaperature illumination of said target at least in one axis, where interrogation is the of at least one subaperture to derive spatio-temporal characterization of a within the region interrogated.

4. The determination method of claim 1, wherein array interrogation is enabled, at least in part, angular motion between at least one array subset and at least one target such that at some in time as the angular distance between said target and at least one subset decreases toward zero, said decrease in angular distance enables illumination of said target, where interrogation is the of at least one subaperture to derive spatio-temporal characterization of a within the region interrogated.

5. The determination method of claim 2, wherein at least one array subset is sized to be intra-aperture, which means that said subset is no larger than a size comparable in angular angular extent in least one axis to said target, in said axis.

6. The determination method of claim 5, wherein at least one array subset, but not all array is substantially illuminated at any time, wherein an array subset consists of at least one array .

7. The determination method of claim 5, wherein said beam illuminates only a limited subset array subapertures.

8. The determination method of claim 7, wherein said radiation can sequentially interrogate least two array subsets, where interrogate means to illuminate at least one subset.

9. The determination method of claim 8, wherein said illumination incorporates radiation exhibiting spatio-temporal tagging to discriminate amongst subaperture illuminators thus enabling determination of relative intra-field of view position from that portion of the radiation which is redirected from said target.

10. The determination method of claim 9, wherein said tagging incorporates at one from the groupcomprising tracking the relative time phase of at least one array subset relative a reference time, the amplitude modulation of at least one illuminated array subset, the wavelength of at least one illuminated array subset, and the polarization modulation of at one illuminated subset.

11. The determination method of claim 9, wherein relative motion between the array centroid at least one target is minimized.

12. The determination method of claim 9, wherein said target is and recorded imaged.

13. The determination method of claim 8, wherein said radiation incorporates at least one of the properties from the group comprising the selection of at least one illumination wavelength poorly detected by a target, selection of at least one illumination polarization with low detectability by a target, and angular translation toward a target from a direction least likely to be detected by a target.

14. The determination method of claim 5, wherein relative motion between the array centroid at least one target is minimized.

15. The determination method of claim 5, wherein any from the group comprising at least one subaperture, and at least one array subset, subtends an angular region in space, wherein said region in space is also a target subaperture which is substantially smaller than the target in extent along at least one axis.

16. The determination method of claim 15, wherein said beam illuminates only a limited subset target subapertures.

17. The determination method of claim 16, wherein said radiation sequentially interrogates least two array subsets.

18. The determination method of claim 15, wherein said illumination incorporates radiation spatio-temporal features which are devised to enable discrimination amongst subaperture thus enabling determination of relative position from that portion of the radiation which is directed from said target.

19. The determination method of claim 18, wherein said radiation is chosen with at least one of properties from the group comprising the selection of at least one illumination wavelength chosen for detectability by a target, selection of at least one illumination polarization chosen for low detectability a target, and the ability to be angularly translated through multiple subapertures toward a target from a least likely to be detected by a target.

20. The determination method of claim 18, wherein relative motion between the array and at least one target is minimized.

21. The determination method of claim 15, wherein relative motion between the array centroid at least one target is minimized.

22. The determination method of claim 15, wherein said beam preferentially illuminates at least target subset exhibiting substantially higher radiation redirection enhancement than than that of the on average, wherein a target subset comprises at least one target subaperture.

23. The determination method of claim 22, wherein said target subaperture exhibiting higher radiation redirection enhancement is a feature is at least one from the group a reflection redirection feature such as a retro-reflective license plate, radiation emitting such as headlights and tail-lights, reflectors such as mirrors, and energy scattering regions.

24. A covert method of determining at least one spatio-temporal characteristic of a target object comprising, the generation of at least one beam of radiative by at least one energy spatio-temporal characteristic detector, the manipulation of the angular subtense of said beam in at least one axis perpendicular to the outgoing beam path of said beam, wherein said beam subtense is less in magnitude than three times the subtense of said target object along said axis, the propagation of said beam into a portion of a region of space defined in angular extent by a full field of view, wherein said full field of view is nominally perpendicular to said beam axis, the manipulation of the relative locations of said beam subtence and said target object subtence to substantially overlap within said full field of view, the collection of a portion of said beam which overlaps said target object, and the manipulation of the collected beam energy to determine at least one spatio-temporal characteristic of said target object.

25. The method of determining at least one spatio-temporal characteristic of claim 24 wherein, along at least one full field of view axis, the subtense of said beam is less than five times the angular subtense of an enhancement feature attached to said target object.

26. The method of determining at least one spatio-temporal characteristic of claim 24 wherein said illumination incorporates at least two subapertures of said full field of view wherein the radiation illuminating at least one subaperture differs from at least one other subaperture within said full field of view due to the incorporation of at least one tagging feature by which said subaperture locations within said full field of view are determined.

27. The method of determining at least one spatio-temporal characteristic of claim 26 wherein at least one subarray overlaps a target object, wherein said subarray comprises at least one subaperture of said full field of view, and said subarray is preferentially illuminated a greater fraction of time when compared to least one subaperture outside of said subarray and not within another subarray, and wherein when more than one subarray is preferentially illuminated, the relative time of said illumination of at least one subarray compared to at least one other subarray is at least one from the group comprising simultaneous, multiplexed, and sequential.

28. The method of determining at least one spatio-temporal characteristic of claim 27 of determining at least one from the group comprising spatial location, and any time derivative of the spatial location of a target object including speed and acceleration, wherein said spatio-temporal characteristic is determined both along directions parallel and perpendicular to the axis of the beam path.

29. The method of determining at least one spatio-temporal characteristic of claim 28 wherein radiation returning from said target object is manipulated to form an image sufficient to identify said object.

30. The method of determining at least one spatio-temporal characteristic of claim 25 wherein at least 30 percent of said collected beam energy returned from the target is from said enhancement feature.

31. The method of determining at least one spatio-temporal characteristic of claim 30 wherein the position of at least one subarray is nominally overlaps a target object, and wherein said subarray position is adjusted to stay at least partially overlapped when the target object position in the full field of view changes.

* * * * *